(12) United States Patent
Townsend

(10) Patent No.: US 10,995,041 B2
(45) Date of Patent: *May 4, 2021

(54) SYSTEM AND METHOD FOR REPROCESSING ANIMAL BEDDING

(71) Applicant: Shelly Ann Townsend, Paris, KY (US)

(72) Inventor: Shelly Ann Townsend, Paris, KY (US)

(73) Assignee: EQUINE ECO GREEN, LLC, Millsboro, DE (US)

( * ) Notice: Subject to any disclaimer, the term of this patent is extended or adjusted under 35 U.S.C. 154(b) by 200 days.

This patent is subject to a terminal disclaimer.

(21) Appl. No.: 16/408,068

(22) Filed: May 9, 2019

(65) Prior Publication Data

US 2019/0263727 A1 Aug. 29, 2019

Related U.S. Application Data

(60) Continuation of application No. 15/279,153, filed on Sep. 28, 2016, now Pat. No. 10,626,059, which is a
(Continued)

(51) Int. Cl.
*A01K 1/015* (2006.01)
*B65B 63/00* (2006.01)
(Continued)

(52) U.S. Cl.
CPC ............ *C05F 11/00* (2013.01); *A01K 1/0152* (2013.01); *A01K 1/0155* (2013.01); *B08B 3/044* (2013.01); *B08B 3/08* (2013.01); *B08B 7/00* (2013.01); *B29C 43/003* (2013.01); *B29C 43/021* (2013.01); *B65B 37/02* (2013.01);
(Continued)

(58) Field of Classification Search
CPC .......................... A01K 1/0152; A01K 1/0155
USPC ...... 53/428, 436, 437, 438, 111 R, 521, 525, 53/527; 44/589; 119/171, 172, 174; 209/10
See application file for complete search history.

(56) References Cited

U.S. PATENT DOCUMENTS 3,353,947 A * 11/1967 Kramer ..................... A01C 3/00
71/21
3,853,622 A * 12/1974 Rutten ....................... B05C 3/04
134/25.4
(Continued)

FOREIGN PATENT DOCUMENTS

EP 1433379 6/2004 ............... A01K 1/01
FR 2400837 A1 * 3/1979 ........... A01K 1/0152
(Continued)

*Primary Examiner* — Stephen F. Gerrity
(74) *Attorney, Agent, or Firm* — Ernest D. Buff; Ernest D. Buff & Associates, LLC

(57) ABSTRACT

A method and system reprocess soiled animal bedding material commingled with animal manure. In one aspect the soiled animal bedding material is separated in a shaker to send at least a preponderance of the manure to a holding tank. In another aspect the bedding is cleaned, rinsed and color is restored. The bedding material is subsequently dried and a bedding product, fertilizer product, and/or compacted product is formed. Alternatively, the bedding material is dried (without a compacting step) to form a product. In yet another aspect, the steps of separation, cleaning, rinsing and/or color restoration may be omitted.

17 Claims, 8 Drawing Sheets

Related U.S. Application Data continuation-in-part of application No. 13/986,758, filed on Jun. 3, 2013, now Pat. No. 9,596,827, which is a division of application No. 12/653,288, filed on Dec. 11, 2009, now Pat. No. 8,464,500.

(60) Provisional application No. 61/154,697, filed on Feb. 23, 2009.

(51) Int. Cl.
| | |
|---|---|
| B65B 63/02 | (2006.01) |
| B65B 1/04 | (2006.01) |
| C05F 11/00 | (2006.01) |
| C10L 5/40 | (2006.01) |
| B29C 43/00 | (2006.01) |
| B29C 43/02 | (2006.01) |
| C05F 17/00 | (2020.01) |
| C10L 5/42 | (2006.01) |
| B08B 7/00 | (2006.01) |
| B08B 3/08 | (2006.01) |
| C10L 9/08 | (2006.01) |
| B65B 37/02 | (2006.01) |
| B08B 3/04 | (2006.01) |
| C10L 5/44 | (2006.01) |
| B29K 1/00 | (2006.01) |
| B29L 31/00 | (2006.01) |
| C10L 5/36 | (2006.01) |
| B65B 5/06 | (2006.01) |
| B65B 5/04 | (2006.01) |
| B65B 65/00 | (2006.01) |

(52) U.S. Cl.
CPC ............ *B65B 63/00* (2013.01); *C05F 17/00* (2013.01); *C10L 5/40* (2013.01); *C10L 5/42* (2013.01); *C10L 9/08* (2013.01); *B29K 2001/00* (2013.01); *B29L 2031/00* (2013.01); *B29L 2031/70* (2013.01); *B65B 1/04* (2013.01); *B65B 5/045* (2013.01); *B65B 5/067* (2013.01); *B65B 63/02* (2013.01); *B65B 65/003* (2013.01); *C10L 5/361* (2013.01); *C10L 5/363* (2013.01); *C10L 5/365* (2013.01); *C10L 5/368* (2013.01); *C10L 5/442* (2013.01); *C10L 5/445* (2013.01); *C10L 2200/0209* (2013.01); *C10L 2230/06* (2013.01); *C10L 2230/083* (2013.01); *C10L 2230/10* (2013.01); *C10L 2230/18* (2013.01); *C10L 2290/06* (2013.01); *C10L 2290/08* (2013.01); *C10L 2290/26* (2013.01); *C10L 2290/30* (2013.01); *C10L 2290/40* (2013.01); *C10L 2290/545* (2013.01); *C10L 2290/546* (2013.01); *Y02E 50/10* (2013.01); *Y02E 50/30* (2013.01); *Y02P 20/145* (2015.11); *Y02W 30/40* (2015.05)

(56) References Cited

U.S. PATENT DOCUMENTS

| | | | | |
|---|---|---|---|---|
| 4,038,944 | A | | 8/1977 | Tucci ............................ 119/458 |
| 4,201,128 | A | * | 5/1980 | Whitehead et al. ... A01K 1/0155 100/218 |
| 4,205,624 | A | | 6/1980 | Yacus ........................... 119/174 |
| 4,625,679 | A | * | 12/1986 | Hill ...................... A01K 1/0155 119/172 |
| 4,788,936 | A | * | 12/1988 | Billings ............... A01K 1/0155 119/171 |
| 4,924,808 | A | * | 5/1990 | Pirotte ................ A01K 1/0155 119/171 |
| 5,195,465 | A | * | 3/1993 | Webb et al. ............. C02F 1/681 119/172 |
| 5,232,584 | A | | 8/1993 | Wang et al. ................... 210/139 |
| 5,352,780 | A | | 10/1994 | Webb et al. ..................... 536/56 |
| 5,361,708 | A | * | 11/1994 | Barnes ................. F26B 11/028 110/246 |
| 5,429,073 | A | | 7/1995 | Ballard ......................... 119/171 |
| 5,720,393 | A | | 2/1998 | Wedel et al. .................. 209/13 |
| 5,927,513 | A | | 7/1999 | Hart .............................. 209/677 |
| 6,044,980 | A | * | 4/2000 | Houle .................. B01D 33/466 210/396 |
| 6,099,660 | A | | 8/2000 | Davis et al. .................... 134/21 |
| 6,508,965 | B1 | * | 1/2003 | Webb ..................... C10L 5/44 264/118 |
| 6,860,236 | B2 | * | 3/2005 | Wood ..................... A01K 31/04 119/161 |
| 7,225,757 | B1 | | 6/2007 | Fagan .......................... 119/171 |
| 7,334,345 | B2 | | 2/2008 | Lasonde ......................... 34/181 |
| 7,341,024 | B2 | * | 3/2008 | Wood ..................... A01K 1/01 119/416 |
| 7,410,454 | B1 | | 8/2008 | Levine .......................... 493/373 |
| 7,552,827 | B2 | * | 6/2009 | Menke et al. ............ A01K 1/01 209/156 |
| 8,147,772 | B2 | * | 4/2012 | Wilford .................... A61L 2/06 422/309 |
| 8,464,500 | B2 | * | 6/2013 | Townsend ............ A01K 1/0155 53/428 |
| 9,596,827 | B2 | * | 3/2017 | Townsend ............ A01K 1/0152 |
| 9,752,089 | B2 | * | 9/2017 | Kennedy ................. C10L 9/083 |
| 2001/0032595 | A1 | * | 10/2001 | Lloyd .................. A01K 1/0155 119/171 |
| 2003/0089644 | A1 | * | 5/2003 | Hanks ........................ B07B 1/16 209/665 |
| 2003/0192485 | A1 | | 10/2003 | Opfel ............................ 119/526 |
| 2003/0192816 | A1 | | 10/2003 | Opfel ............................ 209/133 |
| 2003/0222000 | A1 | | 12/2003 | Opfel ........................... 209/139.1 |
| 2004/0025422 | A1 | | 2/2004 | MacQuoid ........................ 47/9 |
| 2004/0084064 | A1 | | 5/2004 | Verderosa et al. ............. 134/10 |
| 2004/0118358 | A1 | * | 6/2004 | Davis ................... A01K 1/0155 119/171 |
| 2004/0121114 | A1 | * | 6/2004 | Piana et al. .......... D06M 13/332 428/85 |
| 2004/0200428 | A1 | | 10/2004 | Wood ........................... 119/442 |
| 2005/0016062 | A1 | | 1/2005 | Bonnell-Rickard et al. ... 44/535 |
| 2005/0166857 | A1 | * | 8/2005 | Deroo et al. ......... A01K 1/0155 119/171 |
| 2006/0010712 | A1 | * | 1/2006 | Carin et al. ................ C05F 7/00 34/443 |
| 2006/0027181 | A1 | | 2/2006 | Ikegami et al. ............... 119/169 |
| 2006/0101881 | A1 | * | 5/2006 | Carin et al. ............ F26B 23/001 71/21 |
| 2006/0243677 | A1 | | 11/2006 | Sheahan ....................... 210/800 |
| 2007/0006526 | A1 | | 1/2007 | Cullen ........................... 44/589 |
| 2008/0047312 | A1 | * | 2/2008 | Hill et al. ................ A01N 25/08 71/21 |
| 2008/0053877 | A1 | | 3/2008 | Gemmill ....................... 209/615 |
| 2008/0083659 | A1 | | 4/2008 | Menke et al. ................. 209/158 |
| 2010/0193416 | A1 | * | 8/2010 | Barbaro et al. ............ C02F 9/00 210/102 |
| 2010/0212262 | A1 | * | 8/2010 | Townsend ............ A01K 1/0155 53/438 |
| 2010/0300368 | A1 | * | 12/2010 | Myers et al. ......... A01K 1/0155 119/171 |
| 2012/0285081 | A1 | * | 11/2012 | Richey ..................... C10L 5/361 44/535 |
| 2013/0112150 | A1 | * | 5/2013 | Ellis et al. ............ A01K 1/0155 119/172 |
| 2014/0026472 | A1 | * | 1/2014 | Richey ..................... C10L 5/36 44/535 |
| 2014/0261210 | A1 | * | 9/2014 | Boote et al. ......... A01K 1/0155 119/172 |
| 2014/0352623 | A1 | * | 12/2014 | Townsend ............ A01K 1/0155 119/171 |
| 2015/0140630 | A1 | * | 5/2015 | Kennedy .................... C10L 5/08 435/167 |
| 2016/0295830 | A9 | * | 10/2016 | Townsend ............ A01K 1/0152 |

(56) References Cited

U.S. PATENT DOCUMENTS

2017/0081251 A1\* 3/2017 Townsend ............ A01K 1/0152
2017/0196193 A1\* 7/2017 Cross et al. ......... A01K 1/0152

FOREIGN PATENT DOCUMENTS

| GB | 2100569 | 1/1983 | ............ A01K 1/015 |
| GB | 2305103 | 12/1996 | |
| WO | WO-8304048 A1 \* | 11/1983 | ................ C10L 5/40 |
| WO | WO-2013167918 A1 \* | 11/2013 | .............. C05F 11/00 |

\* cited by examiner

Note: Footprint is for full projected capacity of 500,000 yards, initial facility is 125,000

SYSTEM AND METHOD FOR REPROCESSING ANIMAL BEDDING

CROSS-REFERENCE TO RELATED APPLICATIONS

This application is a continuation of applicant's co-pending U.S. patent application Ser. No. 15/279,153 filed Sep. 28, 2016 entitled "System and Method for Reprocessing Animal Bedding" which, in turn, is a continuation in part of applicant's co-pending U.S. patent application Ser. No. 13/986,758 filed Jun. 3, 2013 entitled "System and Method for Reprocessing Animal Bedding" which, in turn, is a divisional of applicant's U.S. patent application Ser. No. 12/653,288 filed Dec. 11, 2009 entitled "System and Method for Reprocessing Animal Bedding," now U.S. Pat. No. 8,464,500 which, in turn, claims the benefit of U.S. Provisional Application Ser. No. 61/154,697, filed Feb. 23, 2009, entitled "Recycled Animal Bedding With A Chemical Process That Returns Them Back Very Close To The Original State, And Creates A Bi-Product That Can Be Used As Fertilizer," the disclosures of which are hereby incorporated in their entirety by reference thereto.

BACKGROUND OF THE INVENTION

1. Field of the Invention

The present invention relates to the reprocessing of animal bedding material; and more particularly to a system and process for cleaning and sanitizing animal bedding material to remove animal waste products commingled therein, permitting it to be reused as bedding or recycled as a raw material for producing other end-use products.

2. Description of Related Art

Domestic animals are widely kept by humans for pleasure, sport, or doing useful work. These animals are often housed in stalls, pens, cages, or other confining enclosures in which a bedding material is disposed on the floor to absorb the liquid and solid waste products of the animal. The absorbency of the bedding material reduces the animal's contact with the waste, improving comfort and minimizing skin irritation and disease. Large animals, such as horses, produce proportionately large amounts of waste. For example, it is estimated that a typical horse weighing about 1000 pounds may produce as much as about 30 pounds of feces and 2.5 gallons of urine daily, for a total of some 50 pounds of total raw waste per day. Soiled bedding removed with the manure during stall cleaning may account for another 8 to 15 pounds per day of waste, resulting in about 12 tons of waste a year per horse. Disposal of this matter presents serious aesthetic issues and, more importantly, environmental concerns for air and water pollution if the waste enters surface bodies of water or underground aquifers. The concerns are particularly acute for farms or other facilities that house large numbers of horses or other large animals.

Conventional practice is that animal bedding is used once and then discarded. Costs, both for producing new bedding and for disposing it after use, continue to increase. Most commonly, the materials used for animal bedding are plant-based. For livestock such as cattle and poultry, straw, hay, sawdust, kenaf, or wood shavings, or combinations thereof, are typically used. Equine bedding typically includes pressed wood pellets, wood shavings, kenaf, or sawdust. With the decline in construction and in manufacture of wood based products there has been a significant decline in the availability of wood pellets, shavings, and sawdust. As a result, bedding can be difficult to find and the cost has increased. Although certain synthetic, polymeric materials have been proposed for bedding, they have not received widespread acceptance in the agricultural community.

Along with the supply problems, costs for disposal have also increased and available techniques are constrained by environmental concerns and, in some cases, by governmental regulations.

Current methods of disposal include: i) composting, ii) spreading on land as fertilizer, iii) stockpiling near the point of generation, and iv) landfilling. Although some benefits may be derived, each of these solutions entails significant difficulties and objections, Composted manure can be used as potting soil, but the process requires a significant amount of land that is sufficiently isolated to prevent the inevitable odors from adversely impacting neighboring properties. Spreading the soiled bedding on land disperses both the waste material and the sawdust, shavings, or the like that form the base of the bedding. While the waste gradually decomposes to provide nutrients compatible with some crops, the concomitant bedding material causes dilution of the soil. As a result, dispersing the material is now being scrutinized and may ultimately be banned. Stockpiling poses a substantial risk that undesired substances may be leached into either underground aquifers or surface bodies of water. In addition, odors emanating a waste pile are objectionable. Landfill dumping incurs substantial and increasing costs for transportation and land fill operation. Moreover, many landfills do not accept manure, as it can interfere with the normal anaerobic decomposition processes if applied improperly or in excessive quantities. Governmental agencies are becoming increasingly concerned about waste management, and therefore have provided some funding through grants and low interest loans for landfill diversion.

The few processes heretofore proposed for separating animal manure and recycling used bedding are typically expensive and detrimentally alter the physical structure and appearance of the material. Thus, they have not been found satisfactory and readily accepted in the marketplace.

SUMMARY OF THE INVENTION

The present invention relates to the reprocessing of soiled animal bedding material. In various aspects, the invention provides a system and process for treating soiled bedding material to remove animal waste and provide material that can be recycled and either used again as bedding or further processed into other products.

In one aspect the soiled animal bedding material is separated in a shaker to send at least a preponderance of said manure to a holding tank. In another aspect the bedding is cleaned, rinsed and color is restored. Said bedding material is subsequently dried and a bedding product, fertilized product, and/or compacted product is formed. Alternatively, said bedding material is dried (without a compacting step) to form a product. In another aspect, the steps of separation, cleaning, rinsing and/or color restoration may be omitted.

One aspect provides a process for reprocessing soiled animal bedding commingled with manure or like animal waste products. The process comprises in sequence the steps of:

a. separating said soiled bedding material in a first shaker/screener to send at least a preponderance of said manure to a holding tank and a remainder of said soiled bedding to a second shaker/screener;
b. cleaning said soiled bedding in said second shaker/screener using a first cleaning agent and transferring said soiled bedding to a third shaker/screener;
c. rinsing said soiled bedding in said third shaker/screener with first rinse for a first rinsing period and dewatering said soiled bedding;
d. collecting waste water resulting from at least one of said washing, rinsing, or draining steps; and
e. drying said bedding to form cleaned recycled bedding material.

Steps a-d may be omitted. The process may include the step of color restoration. Preferably, color restoration is applied during said rinsing of said soiled bedding, however it can be applied prior to drying. The color restoration may comprise paint which, in turn, may include antimicrobial and antifungal agents. Alternatively, the color restoration comprises a dye. Preferably, the color restoration is a color selected from the group consisting of white, cream, shades of beige, and blonde. The color restoration may be comprised of a coloring selected from the group of organic and non-organic pigments. Deodorizers, antimicrobial and/or antifungal agents may be added. In a preferred embodiment the cleaning agent comprises sodium bicarbonate (baking soda). In another embodiment, vinegar and/or lemon may be used in the process for cleaning and deodorizing said bedding. Additives may be added to said bedding after said bedding is dried. These additives may include one or more deodorizers, and/or insect repellents selected from the group consisting of citronella, lavender, and botanicals. The process may include the step of addition of magnets and metal detectors for removal and detection of ferrous and non-ferrous materials in said bedding. Additionally, the process may include the step of packaging the product. The packaging step is preferably carried out by a bagging system configured to receive said product and package it into bags.

The process preferably further includes the step of composting said separated manure. This can be done by compost bins for windrowing and/or using an in-vessel compost system. In a preferred embodiment the bedding material comprises wood shavings.

In another aspect of the process, the step of compacting said dried bedding material to form a compacted product is carried out, preferably by press, and the compacted product is packaged, by, for example, a bagging system configured to receive said compacted product and package it into bags. The compacted product may be formed as pellets, which may be used for burning or may be used for bedding. Alternatively, the compacted product is formed as briquettes and/or manufactured logs.

Another aspect provides a process for reprocessing soiled animal bedding commingled with manure or like animal waste products. The process comprises in sequence the steps of:
a. decontaminating said soiled animal bedding material commingled with manure by heating and drying said soiled animal bedding material in a dryer; and
b. processing said bedding material to yield an end product.

The end product may be a fuel product (such as a briquette, manufactured fire log, and pellets), fertilizer (log, pellets, composted manure), soil amendment product (log, pellets, composted manure), and/or a bedding material (shavings, pellet). The process may include the step of utilizing a grinder on said soiled animal bedding.

The process may include the following step prior to said decontamination step of subsection a: separating said soiled bedding material in a first shaker/screener to send at least a preponderance of said manure to a holding tank and a remainder of said soiled bedding to a second shaker/screener.

Additional steps, in sequence, may be implemented prior to said decontamination step of subsection a:
i. cleaning said soiled bedding in said second shaker/screener using a first cleaning agent and transferring said soiled bedding to a third shaker/screener;
ii. rinsing said soiled bedding in said third shaker/screener with first rinse for a first rinsing period and dewatering said soiled bedding; and
iii. collecting waste water resulting from at least one of said washing, rinsing, or draining steps.

After said decontamination step of subsection "a" the following steps may be carried out: grinding said bedding, compacting said bedding to form a fuel product, and packaging said fuel product; packaging said bedding.

Additives for aroma and/or flame height and color may be added. Representative additives that can be added include hickory, potpourri and/or waxes.

In another aspect, a system for reprocessing soiled animal bedding material commingled with manure to form a compacted product is provided. The system comprises in sequence:
a. a first shaker/screener adapted to separate out at least a preponderance of said manure from said bedding material;
b. a second shaker/screener for cleaning said soiled bedding using a first cleaning agent;
c. a third shaker/screener for rinsing said soiled bedding for a first rinsing period;
d. collecting waste water resulting from at least one of said washing, rinsing, or draining steps in a tank; and
e. drying said bedding to form cleaned recycled bedding material.

The process may further comprise one or more additional cycles of washing and rinsing and/or a bleaching cycle employing a bleaching solution of water and a bleaching agent, and a rinse thereafter.

Thus cleaned, sanitized, and dried, the bedding material may be reused for bedding, and may be packaged, e.g. in bags.

It has been found that after a number of cycles of the present cleaning process, the bedding may no longer have a consistency and appearance that is desirable in the marketplace for high-end bedding applications. By using the processed material as a fuel, the need for costly and environmentally acceptable disposal is obviated and the material's energy content may be beneficially used, providing clear environmental benefits. The processed and decontaminated material is also usable as a feedstock for other applications.

Thus, in another aspect, soiled animal bedding is cleaned and further processed to form other byproducts. For example, the cleaned bedding can be further processed and compressed into compacted shapes in the form of pellets, briquettes, or other desired shapes. All these forms can be burned as fuel. Pellets additionally may be used as an alternate form of animal bedding. Similar techniques can also be used to form fire logs or fire starter logs for domestic use. As used herein, the term fire log refers to a manufactured article sized and shaped to resemble a section of a conventional log appointed for domestic use as fuel in a fireplace, wood stove, or the like. A fire starter log is a smaller, manufactured article also intended for domestic use and adapted to catch fire readily, thus facilitating the building of a fire using other fuels in a fireplace, wood stove, or the like. Fire logs and fire starter logs are herein referred to collectively as manufactured logs. Processed, sanitized bedding can be used as feedstock for other applications as well, such as particle board.

In most cases, bedding appointed for reuse must be bleached to give it the desired appearance and color. On the other hand, appearance is at most a minor issue for manufactured logs, as a dark color is ordinarily acceptable. Thus, bleaching may not be required. The washing and rinsing steps may also be omitted if the soiled bedding is destined for manufactured logs. The shaking operation removes most of the animal excrement, and what remains can be adequately decontaminated by heating and drying the bedding, e.g. in a rotary drum dryer, and with the logs compacted thereafter.

Optionally, suitable additives are included in the final manufactured log product, e.g. to give it desired appearance and mechanical integrity. The additives may also be selected to impart a pleasing aroma or to provide different colors in the flames as the product burns. Such additives may include, for example, wax and/or potpourri.

Optionally, the system includes a second cleaning tank so that two washing steps can be carried out in sequence by transferring material from the first cleaning tank to the second cleaning tank. The second cleaning tank is configured to receive water from the water source and to discharge water through at least one drain. It comprises an agitator configured to cause motion of bedding material within the second cleaning tank.

In some embodiments, the system includes a packaging system, such as a bagging system configured to receive the material after the cleaning and drying operations and package it into bags for storage and distribution. Alternatively, the system includes a press configured to compact the cleaned material into a compacted product, such as pellets, briquettes, or manufactured togs.

The system also optionally includes one or more waste water holding tanks that receive process water from one or more of the washing, rinsing, bleaching, and/or color restoration cycles. The water may then be processed for reuse.

BRIEF DESCRIPTION OF THE DRAWINGS

The invention will be more fully understood and further advantages will become apparent when reference is had to the following detailed description of the preferred embodiments of the invention and the accompanying drawings, wherein like reference numeral denote similar elements throughout the several views and in which.

DESCRIPTION OF THE PREFERRED EMBODIMENTS

Figure 1:
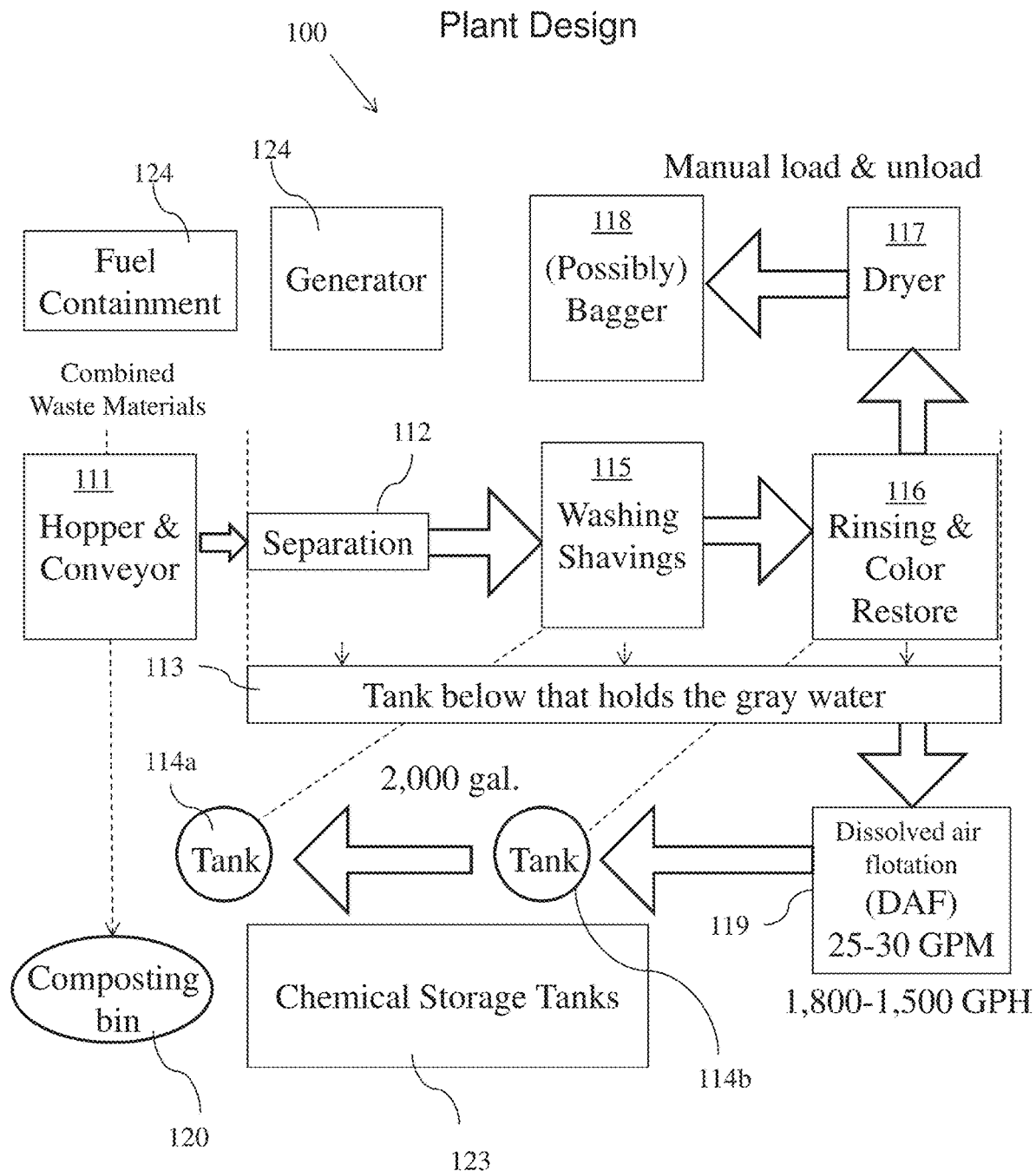
FIG. 1 is a schematic depiction of a process for recycling animal bedding material.

FIG. 1 illustrates one possible implementation of the present animal bedding reprocessing process, shown generally at 100. The process first involves delivery of the soiled bedding material into a vessel or tank, such as a hopper and conveyor device 111. Soiled bedding herein refers to used bedding material that generally includes manure/fecal matter, urine, animal matter, hay, straw, and cellulose bedding material (i.e. wood shavings, such as shavings of pine or fir; and/or pelleted wood). Soiled bedding may include other extraneous particles including bedding alternatives, such as peat moss, shredded newspaper, rice hulls, wheat by-products, shredded phone books, hemp, shredded cardboard, and pelleted straw.

In the embodiment shown in FIG. 1, from the hopper and conveyor device 111 the soiled bedding combined with waste materials is conveyed to a separator device, preferably being a first shaker/screener 112. Separation is carried out typically using a shaker/screener device that shakes the soiled bedding to remove the fecal debris, and the shaker employs a leaf-type vibrating screener. In most cases, bedding appointed for reuse as bedding undergoes the separation step through the first shaker/screener 112, however the separation is not required inasmuch as decontamination has been found to be adequate to break-down fecal matter and pathogens through use of high temperatures during the drying step (discussed in more detail hereinafter) [See FIG. 2, option #2]. When employed, the shaking operation removes a preponderance of the fecal matter/animal excrement, debris and hay/straw to separate out the cellulose bedding, such as shavings. What remains can be adequately decontaminated by heating and drying the bedding, e.g. in a rotary drum dryer. A magnet may be applied to remove metal mixed within the bedding, such as nails, horse shoes, etc.

The removal of the manure can be done by any suitable mechanism, including a gravity feed, a pneumatic system, or a conveyor belt arrangement. The removed manure can be composted to produce fertilizer or potting soil using known techniques via composting bin 120 for windrowing, or for in-vessel composting. Manure is preferably sent for composting traditionally through windrowing or in areas with space constraints, odor and pest concerns it is processed by in-vessel composting systems via composting bin 120. In-vessel material (manure and hay) is held at about 50 to 60% moisture at temperatures of about 131-170 F for three (3) days to kill pathogens and weed seeds. Then the compost material is removed to cool off for a period of about 10 to 12 days, whereupon it may be bagged. Good procedures produce soil amendments that: (i) build soil reserves improving structure stability, and water-holding capabilities; (ii) increase water infiltration rates and root penetration, decreasing extra energy for tillage; (iii) increase seedling ability to sprout; and (iv) stimulate and increase growth of soil microbial populations; and beneficial organisms, such as earth worms.

The optional shaker/screener 112 separator device employed in the first step of the present process operates by sifting the bedding to separate solid manure droppings from the soiled bedding. The incoming bedding passes through one or more screens of the shaker device with the manure sent to manure holding tank or composting bin 120. The manure may be allowed to fall by gravity. Alternatively, a conveyor or other transport means may be used.

Tank 113 holds gray water or waste water generated during the process. Tank 113 is in line with DAF treatment tank 119 which, in turn, is in line with water holding tanks 114a, 114b that enable reuse of water. Chemical storage tanks 123 are provided for holding chemicals/surfactants/dyes/colorings/DAF treatment chemicals/etc. used throughout the plant design process 100.

During separation by the first shaker/screener 112, the shavings/bedding material fall to the bottom deck onto a second shaker/screener 115 where they are cleaned via sprayer shaker for washing. Bedding/shavings with at least a preponderance of the manure removed, then travel, e.g. using a conveyor or gravity fall, to second shaker/screener 115 or vessel wherein the soiled bedding, which is now rendered as predominately shavings, or bedding material, undergoes cleaning. Second shaker/screener 115 preferably is a sprayer shaker for the cleaning operation. Cleaning is understood to mean washing with water, aqueous solutions, surfactants, solvents, including dry cleaning, and/or other cleaning means. Preferably, washing comprises cleaning with a surfactant. Shaking during overhead spraying devices is preferably used for washing and/or cleaning of the bedding material/shavings.

After washing of the bedding material/shavings via second shaker/screener 115, the bedding material/shavings travels, e.g. using conveyor or via a tank having an auger and hatch opening, or via gravity teed falling to a third shaker/screener 116 or vessel to undergo a rinsing and color restoration cycle, and/or neutralizing. Third shaker/screener 116 also is preferably a sprayer shaker that sprays water or liquid to rinse the bedding material/shavings. Color restoration is provided generally to enhance the appearance of the bedding material/shaving. Color restoration may include use of bleach, or dying agents. Bleaching operation is optionally included in the process, either as a discrete step, as part of the rinsing step, or as part of at least one of the washing steps. For the latter, the washing or rinsing solution may include a bleaching agent in addition to e and some surfactant. Preferred bleaching agents include chlorine-containing agents, such as chlorine gas, chlorine dioxide, or sodium hypochlorite. Preferably, bleaching is carried out in a separate bleaching step by soaking the bedding in a chlorine-containing bleaching solution, and thereafter rinsing the bedding with water. Preferably, bleaching is carried out after at least one washing cycle, and most preferably after all washing steps are completed. The concentration and type of bleaching agent used are selected to achieve the desired level of restored coloration to the bedding, without causing breakdown of the structural integrity of the shavings or like bedding material. The present system preferably comprises a bleaching agent dispenser adapted to dispense a preselected amount of a bleaching agent into the first cleaning tank.

During the rinse cycle via spray shaker/third shaker 116, turf paint or food dye may be added in the water for dying the bedding material/shavings. The color preferred is white, however all other colors are contemplated as well. White, cream and shades of beige, blonde are the most preferred color spectrums so that the recycled bedding material/shavings most closely resemble unused bedding materials. The dye, paint, colon (organic, non-organic, pigments) added preferably during the rinse cycle, however they may be added during the wash cycle, and/or rinse and wash cycles combined. There may be more than one washing and/or rinsing cycle. After the washing cycle(s) and rinsing cycle(s) in the shakers, 115, 116, the bedding material/shavings are dewatered to lower the moisture content. Following dewatering, the bedding material/shavings are transferred to dryer 117 which preferably uses a rotary drum and high heat temperatures for drying and removing moisture and to further decontaminate the bedding material/shavings.

The colorant may be dry applied in some instances or separately before entering the dryer 117. The ratios of dye vary according to the amount of coverage and opacity desired. Potassium Sorbate may be added for antimicrobial and fungicide properties, and or combinations or stand-alone antimicrobial and antifungal agents. Antimicrobial and antifungal agents may be added in the paint or separately. The infusion of deodorizers, antimicrobial and antifungal agents may be added in the washing, rinsing, washing and rinsing, into the dye itself, or dry applied before the final product is dried or added after the product is dyed. Baking soda, vinegar may be used in the washing, rinsing, and/or washing and rinsing cycles for cleaning, deodorizing of bedding. Lemon may be included as well for cleaning and/or deodorizing of the bedding. Baking soda may be added to the dried bedding product for odor control. Insect repellents, citronella, lavender, botanical may be added. Chemicals in washing, rinsing, or washing and rinsing, or dry applied prior, during and/or after drying or any of the combinations may be added. Addition of magnets and metal detectors may be provided for removal and detection of ferrous and non-ferrous materials, i.e. horse shoe nails, needles. Holding tanks are not necessary, as the process can be carried out without holding tanks.

After residence in the dryer 117, the recycled bedding material/shavings are packaged or bagged using a bagger 118, or alternatively are placed as bulk bedding material/shavings appointed for hauling and transport for use. The moisture content of the bedding material/shavings for bagging is up to about 17%; more preferably the moisture content is up to about 16%. It has been found that moisture levels higher than about 17% lead to mold and microbial generation and, if stored for a period of time spontaneous combustion. Moisture contents on the low spectrum, lower than 16%, are primarily driven by savings in time and cost of drying, and by industry standards, but could be as low as less than about 1% moisture. Optimal moisture content required to prevent mold and mildew ranges from about 10 to 17%, preferably 12 to 17%, and most preferably from about 14 to 16%. Preferably a vertical bagger is used, such as that sold under the trade name RethPACK VC-3030. The plant design process 100 also includes fuel containment tank(s) 124 and a generator 125 for powering the process. Solar power may be employed, or geopower, to further contribute to the environmentally sound process. The subject process provides a full loop environmentally green process.

Tank 113 holds gray water or waste water generated during the process. Waste from tank 113 is preferably treated by dissolved air flotation (DAF) 119 water treatment process to clarify the wastewaters by the removal of suspended matter such as oil or solids. The removal is achieved by dissolving air in the water or wastewater under pressure and then releasing the air at atmospheric pressure in a flotation tank basin. The released air forms tiny bubbles which adhere to the suspended matter causing the suspended matter to float to the surface of the water where it may then be removed by a skimming device. Dissolved air flotation is very widely used in treating the industrial wastewater effluents from oil refineries, petrochemical and chemical plants, natural gas processing plants, paper mills, general water treatment and similar industrial facilities. A very similar process known as induced gas flotation may alternatively be used for the wastewater treatment. Generally, DAF systems can be categorized as circular (more efficient) and rectangular (more residence time). The former type requires just 3 minutes; an example is a Wockoliver DAF system. The rectangular type requires 20 to 30 minutes; a typical example is a Syskill DAF system. One of the bigger advantages of the circular type is its spiral scoop. Treated waste water is housed in tanks 114a, 114b for reuse.

Combined waste material, including combined manure and/or manure and hay, straw, shavings, may be recycled and cleaned to yield bedding for packaging or bulk loading reuse, composting of manure and other waste materials, and/or packaging or compacting of waste material and/or cellulose bedding to form end use products, such as kindling, pellets, fire logs and/or briquettes. The process provides for the separation of soiled bedding comingled with manure, waste, hay and shavings, or alternatively the separation can be omitted. Where the manure is separated from the bedding, it is appointed to undergo composting and the bedding material can then be washed (or washing skipped), dried to yield recycled bedding material and/or subject to compacting to provide fuel products and organic compost. Alternatively, the combined waste material does not undergo separation and is used to produce fuel products.

Hammering and grinding to compose materials into smaller uniform particles may be carried out before drying or after drying the materials, separated and/or unseparated. Separated and/or unseparated materials may proceed to the grinder or dryer in different sequences. For example, materials are dried and then subjected to a grinder to be ground/hammered for uniformity prior to compressing into fire logs, briquettes, pellets and/or fire starters. Alternatively, materials are subjected to the grinder to be ground/hammered and then dried prior to compressing into fire logs, briquettes, pellets and/or fire starters. Commingling of the soiled bedding with manure is preferably utilized for producing the recycled bedding material, and/or fuel products. Wherein soiled bedding with manure is not separated and the object is to render recycled bedding material (i.e. recycled shavings), optionally the bedding material may be subject to washing, cleaning and/or dry cleaning, and rinsed as necessary, and then subject to high heat for drying and decontamination of any residual fecal matter. Alternatively, wherein the soiled bedding is not separated and the object is to render recycled bedding material (i.e. recycled shavings) the bedding material is not washed or cleaned (i.e. no washing, cleaning, dry cleaning, or rinsing step) and the bedding material with comingled manure is directly subjected to the dryer for decontaminated and drying/removal of moisture as discussed herein. Where the soiled bedding comingled with manure and hay is appointed for use in generating fuel products, such as kindling, pellets or fire logs, the process preferably skips separation, washing, cleaning, and/or rinsing and is subjected to drying (and/or grinding). Wrapper and accelerant are preferably added to the covering/packaging of the fire logs, briquettes, fire starters. Brown paper wrappers are preferably utilized for the fire logs. Paper cups are preferably utilized for the fire starters. A layer of accelerant may be applied on the fire starters. Additives such as hickory, mesquite and other flavor enhancements may be added for cooking over and/or combinations of two or more enhancements may be added in the fire/wood pellets, logs and briquettes.

Figure 2:
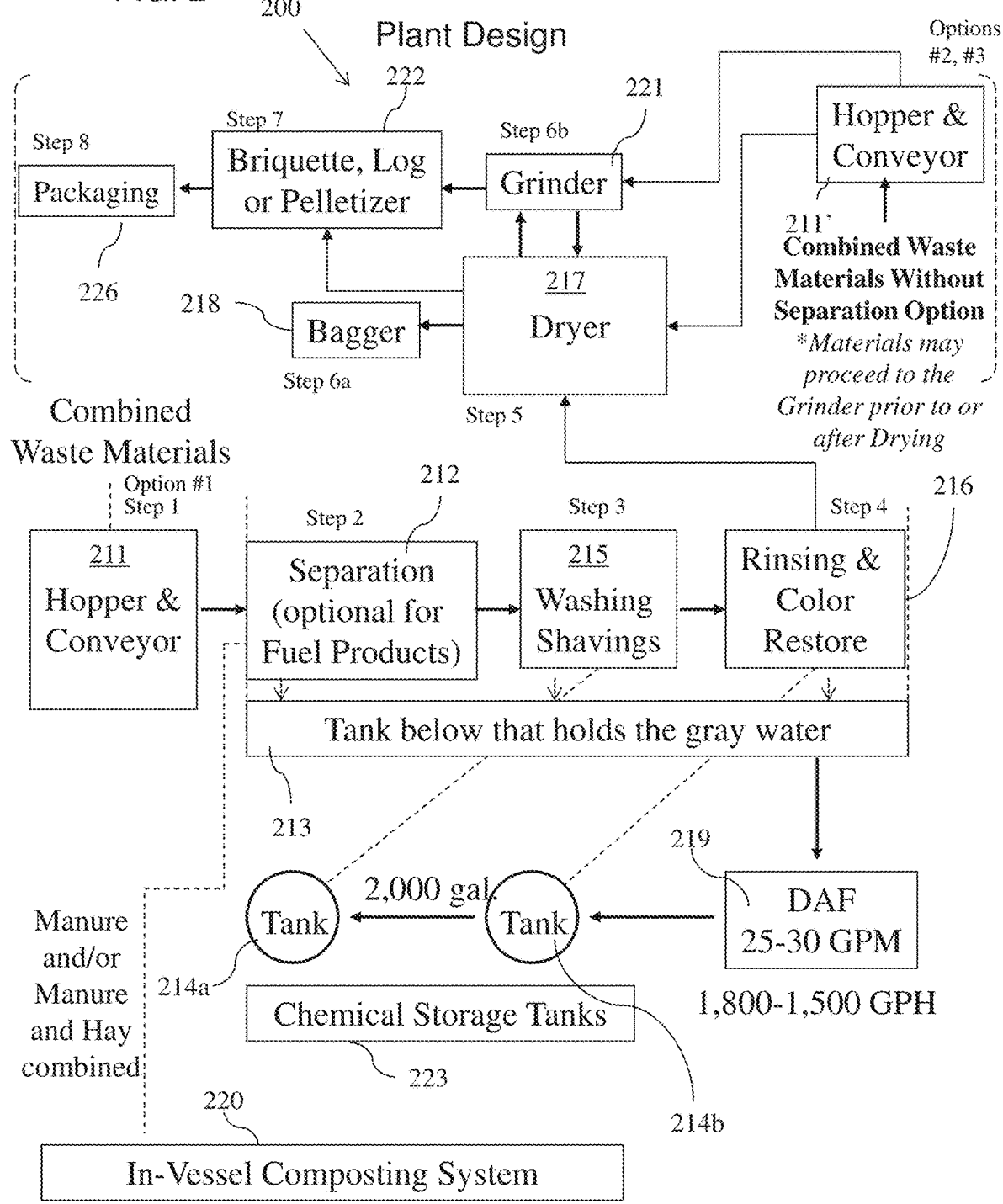
FIG. 2 is a schematic depiction of a process for recycling animal bedding material.

FIG. 2 illustrates another possible implementation of the present animal bedding reprocessing process, shown generally at 200. FIG. 2 includes a plant design having at least three main options #1-3 discussed herein bellow that depend on the end product sought. Option #1 is a process for end product recycled bedding material or shavings (but could be utilized for fuel products, though not recommended as it includes several steps that are not deemed necessary for the fuel product finished product) and includes separation (optional), cleaning, rinsing and color restoration, drying, optional bagging for recycled bedding shavings, or optional grinding, bagging, and/or compacting for fuel products. Option #2 is another process for end product recycled bedding material or shavings wherein option 41 is carried out but the separation, washing, and rinsing steps are omitted, relying on the high temperature for decontamination of the fecal matter and pathogens. Option #3 is a preferred process for end product fuel products (kindling, briquettes, fire logs, pellets, etc.) and is carried out by omitting the separation, washing, and rinsing and color restoration steps, Each of the process options are discussed in detail herein below.

FIG. 2, option #1 provides a process for yielding recycled bedding material/recycled shavings:

Step 1: delivery of the soiled bedding material into a vessel or tank, such as a hopper and conveyor device 211 in line with a shaker separator.

Step 2: the soiled bedding combined with waste materials is delivered from the hopper and conveyor device 211 to a separator device, herein a first shaker/screener 212. However, the separation is optional and may be omitted. It is noted that, wherein the end product is to yield high end recycled bedding material/recycled shavings to be used in bedding the separation step is preferably carried out. Although, even wherein the end product is bedding, as discussed herein regarding option #2, the separation, washing, and rinsing and color restoration steps may be omitted and decontamination achieved through washing, rinsing and/or drying alone.

Step 3: the shavings/bedding material fall to the bottom deck onto a second shaker/screener 215 for cleaning by way of overhead pressure spray. Tank 213 holds gray water or waste water generated during the process. The removed manure and hay can be composted to produce fertilizer or potting soil using known techniques via composting bin/in-vessel composting system 220. Cleaning involves washing the shavings/bedding material with water, water+bleach, aqueous solutions, surfactants, solvents (including dry cleaning technology, utilizing green dry cleaning chemicals and technology, and vapors. Preferably, washing is carried out using an aqueous solution with surfactant.

Step 4: after washing of the bedding material/shavings via second shaker/sprayer shaker 215 the bedding material/shavings travels, e.g. using conveyor or via tank having an auger and hatch opening, or via gravity fall to a third shaker/screener 216 or vessel/tank to undergo a rinsing and color restoration cycle, and/or neutralizing. This is preferably carried out by way of an overhead high pressure sprayer unit while the bedding material vibrates or shakes. After washing and rinsing cycles, 215, 216, the bedding material/shavings are dewatered to lower the moisture content. It is noted that there may be more than one washing and/or rinsing cycle.

Step 5: the bedding material/shavings are transferred to dryer 217. From dryer 217 the bedding material/shavings may be bagged at 218 or otherwise piled for bulk use. Wherein the bedding material/shavings are appointed to be processed as fuel products, the bedding may be subjected to grinder 221 at Step 6b, then compacted via Briquette, Log or Pelletizer 222 at Step 7, or directly compacted at Step 7, and packaged 226 at Step 8.

Step 6a: the recycled cleaned bedding material/recycled shavings are bagged 218 or otherwise provided as bulk for hauling and transport.

It is noted that tank 213 is in line with DAF treatment tank 219, which in turn is in line with water holding tanks 214a, 214b that enable reuse of water.

Alternatively, another process for yielding recycled bedding material/recycled shavings includes as option #2, omitting several of the steps above in option #1.

Option #2 is another process for end product recycled bedding material or shavings wherein option #1 is carried out but the separation, washing, and rinsing steps are omitted, relying on the high temperature for decontamination of the fecal matter and pathogens.

Step 1 (option #2): delivery of the combined soiled bedding material into a vessel or tank, such as a hopper and conveyor device 211'. It is noted that in FIG. 2 hopper and conveyor device 211' is shown as a separate hopper from 211, the hoppers (211 and 211'). Conversely, the hoppers (211 and 211') may be the same hopper and conveyor and the equipment concerning the omitted steps are simply bi-passed.

Step 2 (option #2): the combined soiled bedding material is conveyed directly to dryer 217.

Step 3 (option #2): the bedding material is bagged 218 or bulk piled for hauling.

Option #3 is a preferred process for end product fuel products (kindling, briquettes, fire logs, pellets, etc.) and is carried out by omitting the separation, washing, and rinsing and color restoration steps. Preferably, option #3 is carried out when the end product is to be a fuel product produced from the soiled bedding material. The following steps in FIG. 2 are taken;

Step 1 (option #3): delivery of the soiled bedding material into a vessel or tank, such as a hopper and conveyor device 211'.

Step 2 (option #3): the combined soiled bedding material may be conveyed to: i) grinder 221 and then to the dryer 217, ii) dryer 217 and then directly to packaging via bagger 218 or compacting into briquette, logs, pellets at 222 followed by packaging 226; iii) dryer 217 and then the pander 221 and then to compacting to form briquettes, logs or pelletizer 222 followed by packaging 226.

Step 3 (option #2): the recycled bedding material is bagged 218 or compacting into briquette, logs, pellets at 222 followed by packaging 226 as discussed in step 2 above to yield fuel products.

Figure 3:
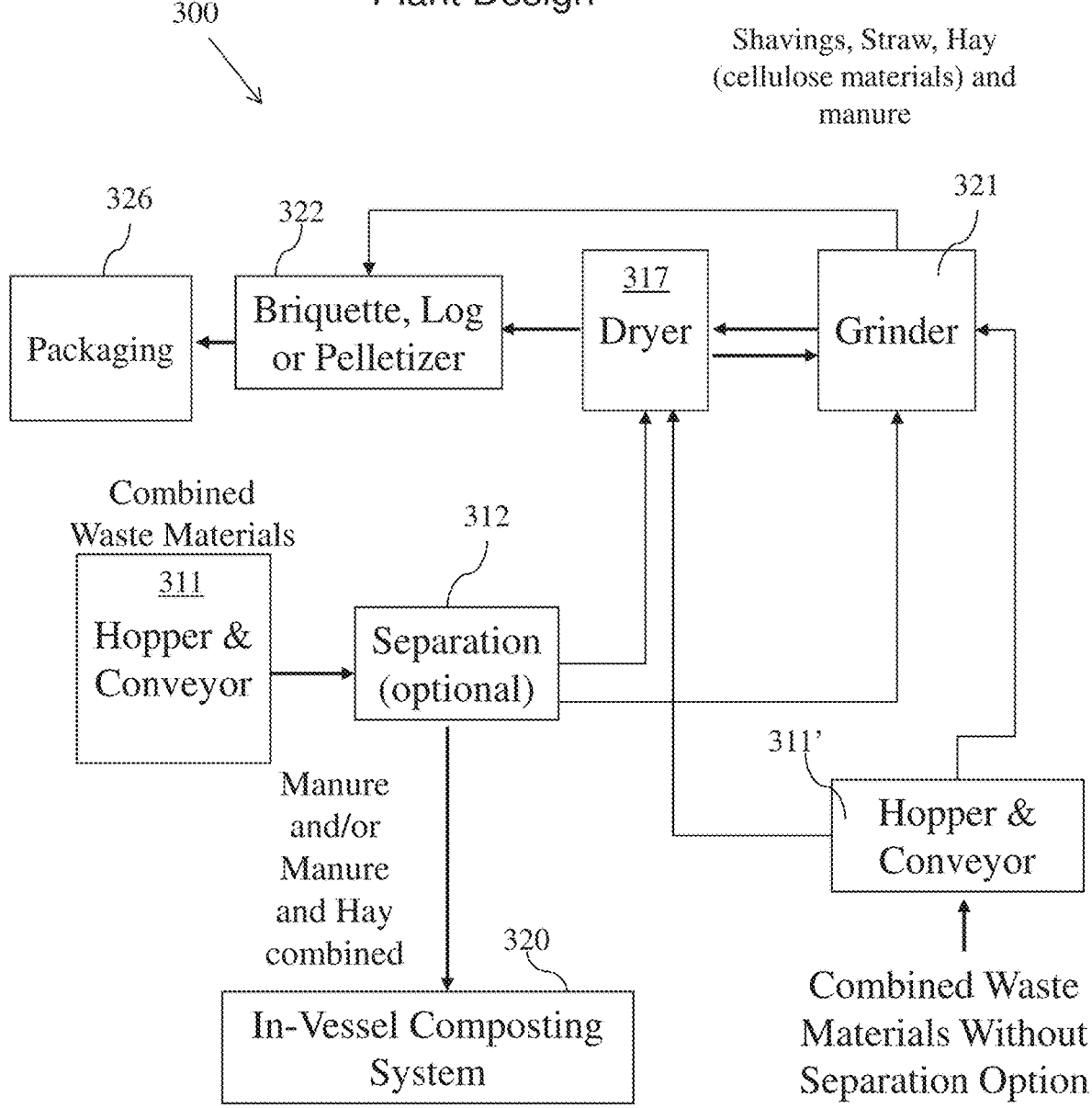
FIG. 3 is a schematic depiction of a process for recycling animal bedding material.

FIG. 3 is a schematic depiction of a process for recycling animal bedding material, shown generally at 300 in the formation of fuel products. The soiled bedding material/combined waste materials are fed into a hopper and conveyor device 311 in line with a shaker separator 312. The soiled bedding material/combined waste materials are optionally fed to a first shaker/screener 312 for separation of bedding material from manure, debris and hay, etc. Alternatively, the separation step can be omitted and decontamination achieved through drying at high heat as discussed herein. Next, the combined soiled bedding material may be conveyed to: i) grinder 321 and then to the dryer 317 followed by compacting into briquette, logs, pellets at 322 followed by packaging 326; or ii) dryer 317 and then directly to compacting into briquette, logs, pellets at 322 followed by packaging 326; or iii) dryer 317 and then the grinder 321, back through the dryer 317 and then compacting into briquette, logs, pellets at 322 followed by packaging 326. Alternatively, the soiled bedding material/combined waste materials are fed into a hopper and conveyor device 311'. The separation step is omitted and decontamination achieved through drying at high heat as discussed herein. Next, the combined soiled bedding material may be conveyed to: i) grinder 321 and then to the dryer 317 followed by compacting into briquette, logs, pellets at 322 followed by packaging 326; or ii) dryer 317 and then directly to compacting into briquettes, logs, pellets at 322 followed by packaging 326; or iii) dryer 317 and then the grinder 321, back through the dryer 317 and then compacting into briquettes, logs, pellets at 322 followed by packaging 326.

Figure 4:
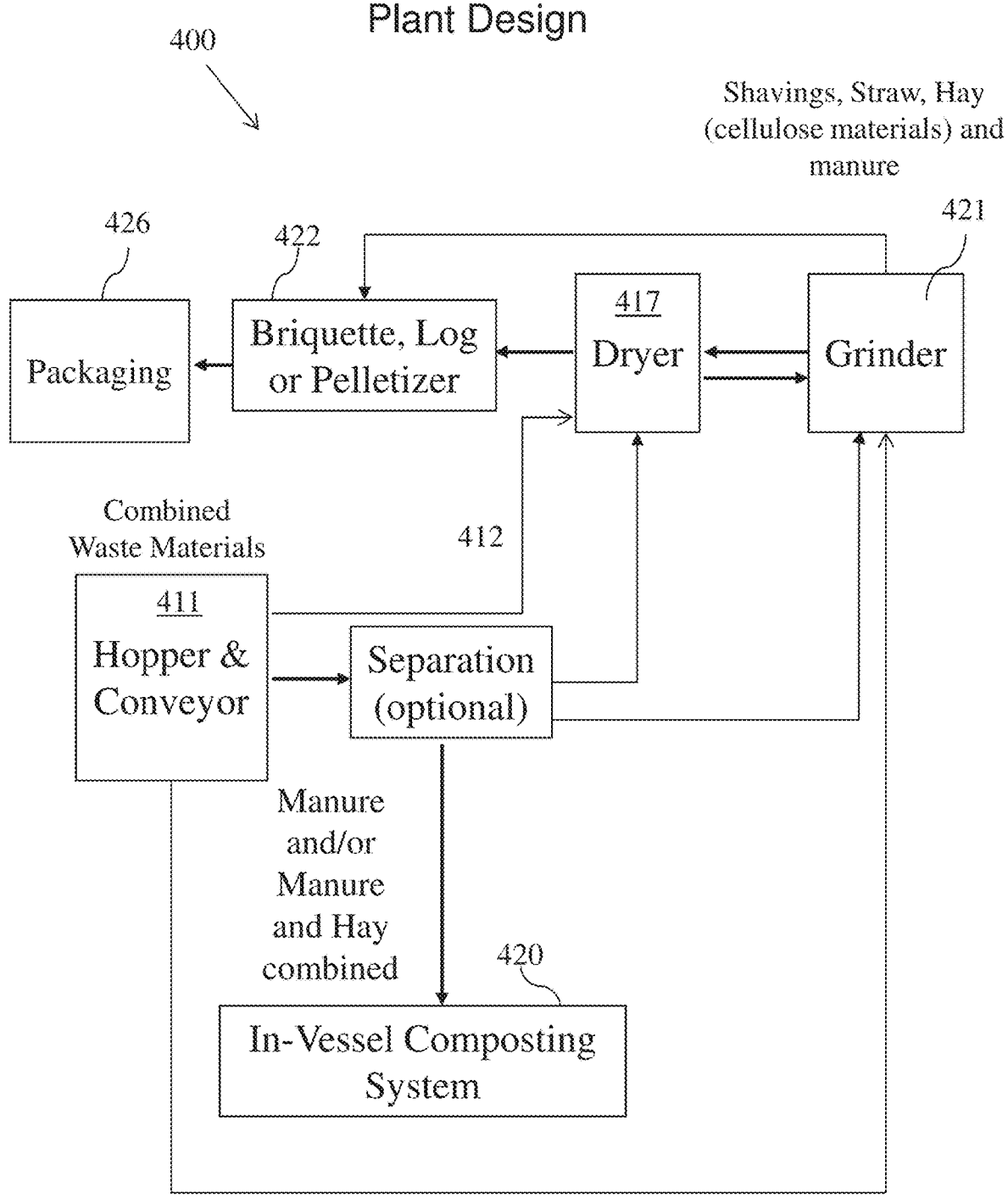
FIG. 4 is a schematic depiction of a process for recycling animal bedding material.

FIG. 4 is a schematic depiction of a process for recycling animal bedding material, shown generally at 400 in the formation of fuel products. In this alternative embodiment, the soiled bedding material/combined waste materials are fed into a hopper and conveyor device 411 that is in-line with a shaker separator 412 that may be optionally hi-passed to omit the shaking step (not in FIG. 3 above separate hoppers, 311 and 311' were provided in that plant design). The soiled bedding material/combined waste materials are optionally separated using a first shaker/screener separator 412. Alternatively, the separation step can be omitted and decontamination achieved through drying at high heat as discussed herein. Next, the combined soiled bedding material may be conveyed to: i) grinder 421 and then to the dryer 417 followed by compacting into briquette, logs, pellets at 422 followed by packaging 426; or ii) dryer 417 and then directly to compacting into briquette, logs, pellets at 422 followed by packaging 426; or iii) dryer 417 and then the grinder 421, back through the dryer 417 and then compacting into briquettes, logs, pellets at 422 followed by packaging 426.

Figure 5:
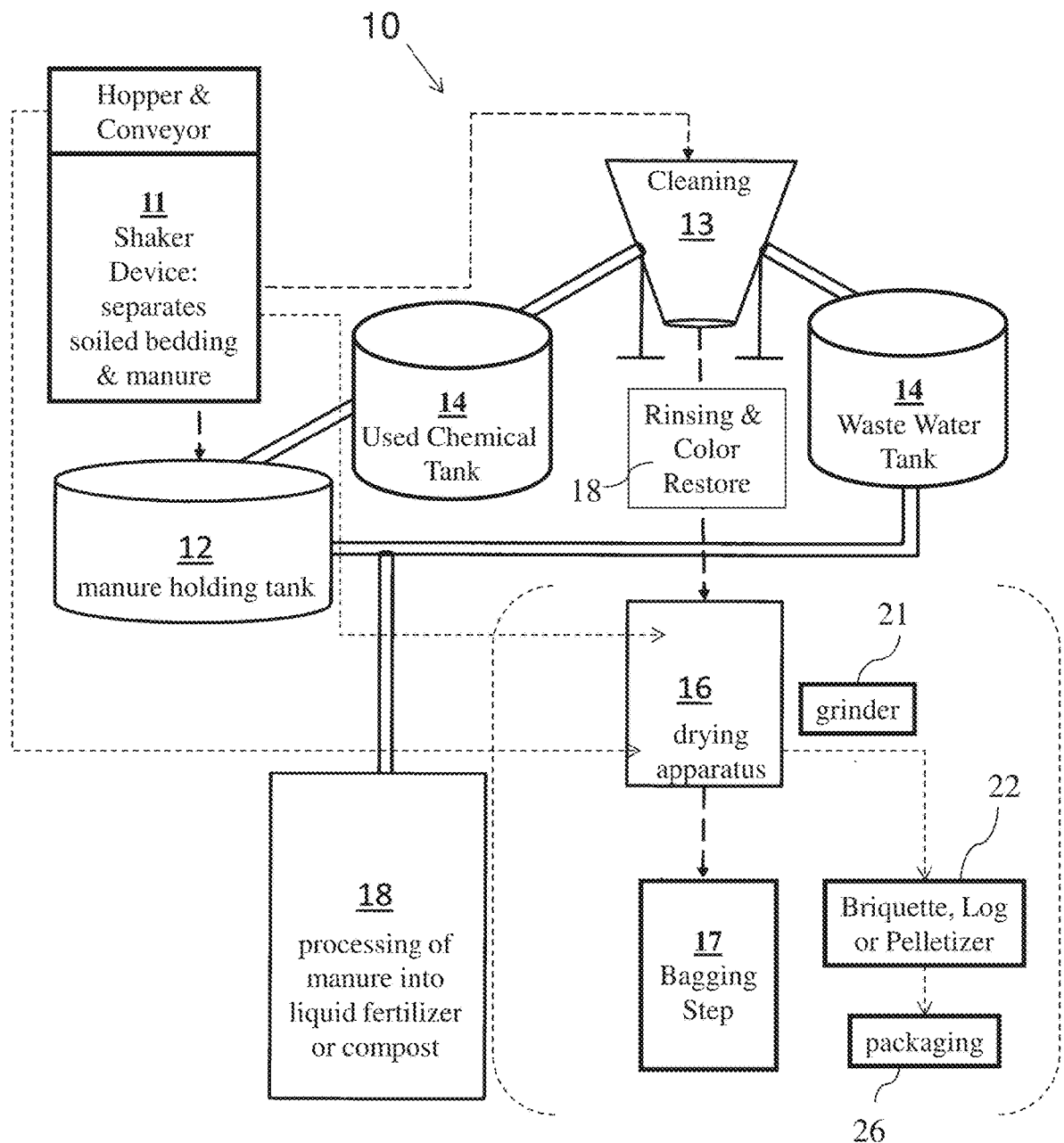
FIG. 5 is a schematic depiction of a process for recycling animal bedding material.

FIG. 5 illustrates another possible implementation of the present animal bedding reprocessing process, shown generally at 10. The process first involves separating soiled bedding and manure in a hopper with shaker device 11. Preferably, separation is achieved by shaking the soiled bedding to remove the fecal debris, and the shaker employs a leaf-type vibrating screener. Upon separation, the manure is removed to manure tank 12. The removal can be done by any suitable mechanism, including a gravity feed, a pneumatic system, or a conveyor belt arrangement. The removed manure can be composted to produce fertilizer or potting soil using known techniques.

The shaker usually employed in the first step of the present process operates by sifting the bedding to separate solid manure droppings from the soiled bedding. The incoming bedding passes through one or more screens of the shaker device with the manure sent to a holding tank 12. The manure may be allowed to fall by gravity, or a conveyor or other transport means may be used. Soiled bedding with at least a preponderance of the manure removed, then travels, e.g. using a conveyor, to tank or shaker 13 for cleaning.

One form of shaker useful in carrying out the separation of manure from bedding comprises a plurality of vibrating, parallel bars, rods, or tines inclined at a slight angle to the horizontal. Bedding to be separated is placed atop the bars, which are spaced apart by a distance that permits shavings or the like, but not pieces of the animal excrement, to fall between them into a collection system. The inclination and vibrating action of the bars urges the manure to migrate downward into a holding bin, yielding an efficient separation with minimal loss of soiled bedding. One useful configuration of such a separator is disclosed in U.S. Pat. No. 5,927,513 to Hart.

The present shaker is readily assembled using components such as sifters, vibrating screeners, shakers, linear screeners, separators and processing equipment available from vendors such as Smico and Triflo, that currently serve the bulk material handling industries.

Soiled bedding is transferred from the shaker system into cleaning tank/shaker 13, wherein it is treated with cleaning products and rinsed with water, preferable while undergoing slow agitation. For example, the agitation may be provided by an overhead rotary impeller. When used to process bedding material that is appointed for reuse, a relatively gentle agitation should be used to prevent over manipulation and breakage of the bedding material. Preferably, the washing is carried out with a ratio of a volume of water used to a volume of soiled bedding being at least 1:1. More preferably the ratio is at least 2:1, and even more preferably, at least 3:1. It is preferred that the water further include a detergent, soap, or other cleaning agent, such as at least one tablespoon of a domestic laundry detergent per gallon of soiled bedding, and more preferably at least two tablespoons per gallon. The present system preferably includes a cleaning agent dispenser adapted to dispense a preselected amount of a cleaning agent into the first cleaning tank. Rinsing is preferably carried out with a ratio of a volume of water used to a volume of soiled bedding of at least 1:1 and, more preferably, at least 2:1. Tank 13, as well as all other tanks in the system, preferably includes one or more drains from which liquid can be removed as needed, either by gravity or by active means such as pumps. Preferably, tank 13 is cylindrical or frustoconical in shape to permit it to act in the manner of a large washing machine vat. Tank 13 can be oriented with its cylindrical axis either vertical or horizontal. In some implementations, tank 13 can be spun rapidly to facilitate centrifugal extraction of liquid at the end of each liquid cycle. In other implementations, a compression device is present and used to squeeze the contents for tank 13 to remove liquids. As another alternative, the bedding being cleaned is transferred after draining from the cleaning tank to a separate dewatering apparatus, which extracts more liquid by centrifugal or compressive action. Suitable systems for carrying out the dewatering include those sold by The Schlueter Company, Janesville, Wis.

Preferably, all the used liquids from the cleaning, rinsing, and bleaching cycles of the present process are collected in one or more wastewater holding tanks. Although the water may be discharged, possibly after remediation needed to comply with environmental requirements, preferably it is recycled to be used in one or more steps of the present process.

Tank 13 further includes an optional hatch at its bottom that can be opened at the end of the cleaning and rinse cycles to allow the material to be removed for drying. For example, material may be directed onto conveyors carrying the material to the drying apparatus 16.

Prior to travel to drying apparatus 16, the bedding material is rinsed and subject to color restoration at 18. After/before drying the bedding material may be subject to grinding 21 and/or directly compacted into briquettes, logs or pellets 22 and packaged 26 for fuel products.

Preferably, a rotary drum drying machine is used to dry the bedding material after it is cleaned and decontaminated, but any suitable dryer capable of reaching the temperature needed to remove moisture and assure that any remaining pathogens are destroyed may also be used, for example, a grain bin with augers. At least part of the fuel for the drum or other type dryer can be provided from the bedding itself, including fines collected during the processing of the bedding. As another alternative, a continuous belt-type dryer carrying the material through a heated zone may be used. The heat source may be of any type, including heat from combustion of a fuel, resistive heating, or infrared lamps. Microwave heating may also be used. Suitable rotary drum dryers include those sold by Energy Unlimited Inc. for manufacturing wood shavings. Fuel feeder units and burners/solid fuel combustion systems/bio mass burners may be used, such as those sold by Jackson Lumber Harvester, Mondovi, Wis., under the trade name Webb Burner™, or by Energy Unlimited, Inc, Dodgeville, Wis.

The drying is typically carried out by placing the cleaned bedding material in a dryer held at temperatures of at least about 300-350° F., and preferably at about 600-800° F. The material is held at temperature in the dryer for a time sufficient to attain required moisture level and to kill any remaining pathogens. At 600-800° F., the drying can often be accomplished in a matter of two to four minutes. After the reprocessed bedding is dried to a desired moisture level, the reprocessed, clean bedding is bagged or otherwise packaged at 17. Typically, wood shavings are dried to a moisture level up to about 17%; more preferably the moisture content is up to about 16%; preferably moisture ranges from about 10 to 17%, more preferably 12 to 17%, and most preferably from about 14 to 16% for reuse as bedding to inhibit formation of mold or mildew. The bagging step at 17 is optionally omitted if the reprocessed bedding is to be sold in bulk form.

As previously noted, the present system and method are primarily intended for reprocessing bedding material so it can be reused for the same purpose. However, other end uses are also possible. For example, after a number of reprocessing cycles, the physical character and appearance bedding may deteriorate. However, such clean reprocessed bedding material is still useful for other applications. It may be compacted using a suitable press or like apparatus into the form of pellets, briquettes, or other articles such as manufactured logs. The pellet form can be also used as bedding, or it can be directly burned as fuel. Shavings intended to be compacted are typically dried to a moisture level ranging from about 5 to 10%, preferably 6 to 9?, and most preferably 8 to 9%, to promote good coherence of the material in the compacted form. Presses suitable for producing briquettes from cleaned bedding include those manufactured by Biomass Briquette Systems, Chico, Calif.

Separation of the manure and debris from the soiled bedding prior to washing can optionally be skipped and the soiled bedding with fecal matter and debris can go directly to cleaning tank 13 for processing. However, separation of the fecal matter mitigates contamination of the process water and allows for a marketable byproduct, e.g. as fertilizer or compost.

In some instances, multiple cleaning cycles are optionally employed. They may be carried out serially in a single tank or, alternatively, in a semi-continuous process using separate cleaning tanks for different cycles, with material being transferred from one tank to the next after each step. The cleaning products and water rinse beneficially improve the cleaning of the soiled bedding, substantially eliminate smell, and restore color.

It is preferred that the soiled bedding not be packed too tightly in the cleaning tank 13, lest the cleaning of the bedding is compromised. Instead, cleaning is best achieved if the bedding material is able to move around and circulate in the cleaning tank 13 during the washing, rinsing, and optional bleaching operations. Whatever material remains in the bedding after the cleaning operation is substantially non-toxic and clean. Too much material in the dryer makes it is difficult to achieve uniform drying in a reasonable time. The temperature actually attained in the bedding during the cleaning and drying steps is preferably sufficient to ensure that any feces remaining in the bedding breaks down and any pathogens are killed, without charring, discoloring, or otherwise damaging the bedding.

The cleaning agents used in the one or more washing steps may include one or more of conventional soaps; detergents (such as those used for domestic laundering), or other suitable surfactants. Further additives may be used, such as alcohol; sodium bicarbonate, or sodium carbonate. Green soaps may be used as the cleaning products to provide even more enhanced environmental benefits to the process as waste from the process itself would be minimized and/or environmentally friendly. The washing and cleaning equipment may include tanks having capacities ranging from small quantities up to over 50,000 gallons of materials, such as those offered for sale by Pittsburgh Tank & Power Company. Preferably, the tank 13 is implemented with an agitator and centrifuge machinery to clean and dewater the solid material. The agitating equipment aids in the cleaning process. Suitable impeller systems and blades are available in various RPM motor speeds, and are offered for sale, e.g. by Triflo. The cleaning tank 13 preferably acts as a large washing machine with material being transferred into and out of the tanks by conveyor belts, pneumatic systems, loading equipment, or the like. A conveyer with sides is preferred to be used in the process to avoid spillage of the bedding material or loss of bedding material during conveying.

One particularly efficacious cleaning detergent that may be used is sold under the trade name SA8 Bio Quest laundry detergent. Other chemicals can be used, such as alcohol, hydrogen peroxide, PineSol® cleaner, OxyClean® powder, and any laundering, dishwashing detergent, soap nuts or magnetic laundering device. The washing, rinsing, and bleaching process steps may be carried out in vats or laundering machines, textile laundering machines. Drying may be accomplished using any suitable source of heat, such as a bin with a device such as an auger system to turn the contents during the heat drying.

The preferred duration of the washing cycle and whether a second washing cycle is needed, depends, in part, on the intended use of the cleaned bedding. For material appointed to be recycled as bedding, a second cycle and longer duration are preferred to provide material with substantially the same color and appearance as raw bedding. Inclusion of a bleaching cycle is also preferred to further enhance appearance. On the other hand, color and appearance are less critical for material to be formed into pellets, briquettes, or logs for fuel, so that only a single short cycle is needed to substantially remove all vestiges of the animal waste.

A bleaching operation is optionally included in the process, either as a discrete step or as part of at least one of the washing steps. For the latter, the washing or rinsing solution may include a bleaching agent in addition to water and some surfactant. Preferred bleaching agents include chlorine-containing agents, such as chlorine gas, chlorine dioxide, or sodium hypochlorite. The present system may include a system for on-site generation of chlorine gas as it is needed. Such a system is economically beneficial and eliminates the hazards involved in transporting and storing chlorine (either as a gas or liquid) or other chlorine-containing agent. Sodium hydroxide, a known byproduct of most industrial processes for producing chlorine gas, may be used as part of the present process or sold for other uses. Preferably, bleaching is carried out in a separate bleaching step by soaking the bedding in a chlorine-containing bleaching solution, and thereafter rinsing the bedding with water. Preferably, bleaching is carried out after at least one washing cycle, and most preferably after all washing steps are completed. The concentration and type of bleaching agent used are selected to achieve the desired level of restored coloration to the bedding, without causing breakdown of the structural integrity of the shavings or like bedding material. The present system preferably comprises a bleaching agent dispenser adapted to dispense a preselected amount of a bleaching agent into the first cleaning tank.

If a chlorine bleaching agent is used, both the waste water and bedding are beneficially dechlorinated using a sulfur-based dechlorinating agent. A preferred agent is sodium thiosulfate, which is relatively benign and non-toxic. Alternative agents include other thiosulfate salts or sulfite, bisulfate, and metabisulfite metal salts, preferably of the alkali or alkali earth metals. These agents may be introduced either from aqueous solution or as solids. The waste water is treated with an amount of dechlorinating agent sufficient to reduce the chlorine or chlorine-containing compounds, including halogenated alkanes, in the waste stream to environmentally acceptable levels. Preferably, enough dechlorinating agent is used to substantially neutralize the chlorine content. It is also preferred that any residual chlorine bleaching agent in the cleaned bedding material be neutralized to prevent any harm or discomfort to animals for whom the recycled bedding is provided.

It is preferred that waste water from the various washing, bleaching, and rinsing steps be collected in one or more waste water holding tanks. The waste water is preferably recycled in a closed loop system to minimize consumption. If needed, the recycled water can be remediated as part of the process. Some waste water can also be mixed with the manure to create a liquid fertilizer product. Alternatively, the water can be disposed after any remediation necessary for environmental compliance.

Used chemical tank 14 and used liquid tank provide storage for used process liquids. Suitable processing and remediation may be given these liquids, to permit them either to be recycled in the continued operation of the present system, used as input for liquefying the removed manure to form fertilizer, or discharged as acceptable effluent.

While the animal waste separated from bedding may be disposed of, burned, or otherwise discarded, it is preferred that it be recycled for secondary use by processing it into liquid fertilizer or composting. Some or all of the process water used in the present method may be blended with the manure to make liquid fertilizer. Alternatively, composting may be carried out by any suitable technique, including windrowing or with in-vessel techniques. In the present process, use of a mechanical separator to segregate the manure is beneficial for composting, as removal of the carbon-rich shavings reduces the ratio of carbon to nitrogen in the incoming material, yielding a superior output composted material that does not degrade agricultural soils. The presence of the shavings also markedly slows the composting. It is generally found that manure by itself will compost in one to two months, whereas mixed material requires three months or more to be fully composted. In-vessel techniques are also generally more efficient in promoting rapid composting than windrowing, and they beneficially reduce the emission of noxious odors. Careful control of temperature and aeration in an in-vessel composting process also reduces the emission of certain greenhouse gasses, including methane and other volatile organic corn pounds.

The present system can be mounted in a fixed installation. It is also possible to dispose the equipment on a trailer or like conveyance, permitting it to be moved to different sites. By moving the equipment closer to barns in which the bedding is used, the cost and difficulty of transporting used bedding is eliminated, and the now-cleaned bedding can be reused, again without incurring any need to transport it. In addition, the need for packaging can often be eliminated, as the cleaned material can be conveniently stockpiled pending use.

Figure 6:
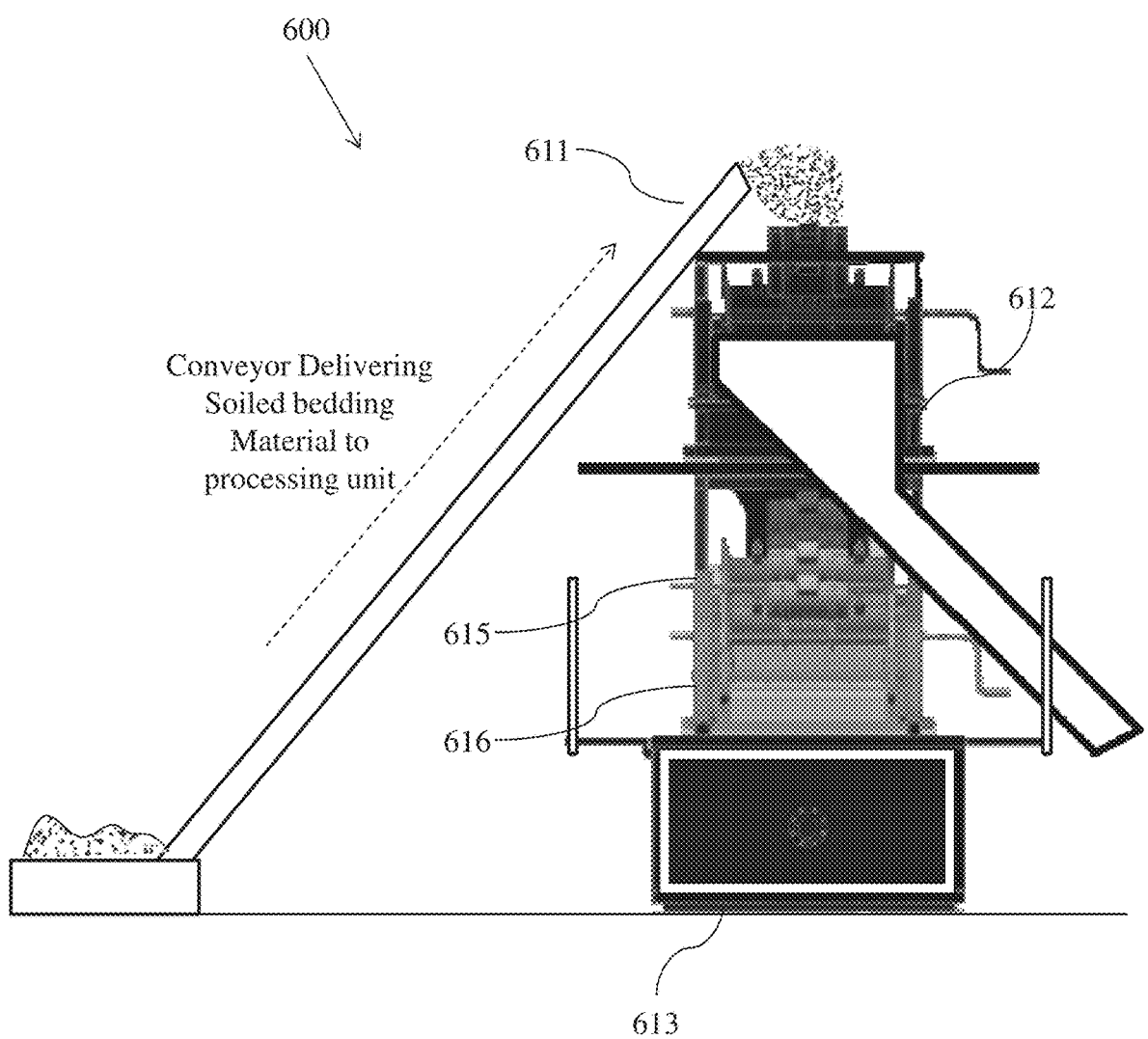
FIG. 6 is a front plan view of a processing assembly for recycling animal bedding material.
Figure 7:
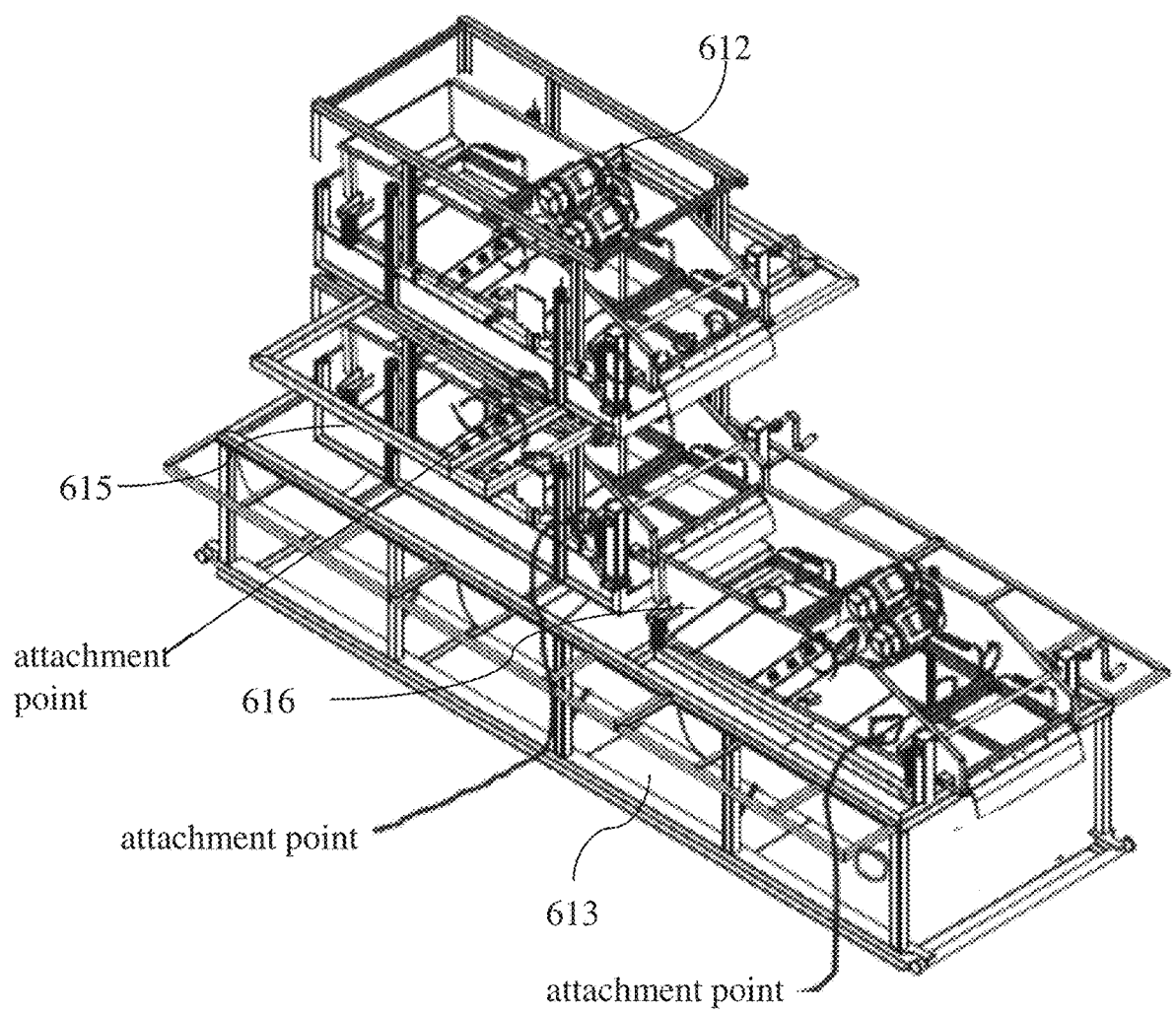
FIG. 7 is a side plan view of the processing assembly of FIG. 6.

Referring to FIGS. 6 and 7, an embodiment of a processing apparatus is shown. FIG. 6 is a front plan view of a processing assembly for recycling animal bedding material. FIG. 7 is a side plan view of the processing assembly of FIG. 6. In the depicted implementation of the present animal bedding reprocessing process, shown generally at 600, a hopper and conveyer 611 conveys soiled bedding material to be recycled to a first shaker/screener 612. (optionally) that separates the manure from the soiled animal bedding. The bedding material falls to an (optional) second shaker 615 that cleans the bedding material, preferably with surfactant. A (optional) third shaker 616 rinses and restores color. A tank 613 is located below that is appointed to receive gray matter Preferably, the tank below is approximately 3,700 gallons. Screening plant sprayers are preferably utilized having flow rates of 20-40 GPM (gallons per minute) to avoid pulverizing the shavings or lose material.

Preferably, the dryer is a modified version of a full size dryer. Modification and further design is provided to accommodate smaller venues such as certain horse shows and racetracks with limited meets and capped numbers of horses.

Combined waste material, manure and/or manure and hay, straw, shavings combined, is manually loaded (or mechanically loaded) into a dryer drum or vessel in communication with a motor that rotates the drum or vessel. Motors having about 10 horsepower (hp) are utilized for rotating the drum or vessel. Air intake preferably ranges from about 14"-15", at 400,000 BTU/hr, single phase 120—11.2 amps, variable speed drive-adjustable 220—33 amps. For example, a motor sold in association with the trade name Salamander is contemplated for use. Preferably, a 3 phase output 220 is used to drive the motor with adjustable speed drive conversion.

Figure 8:
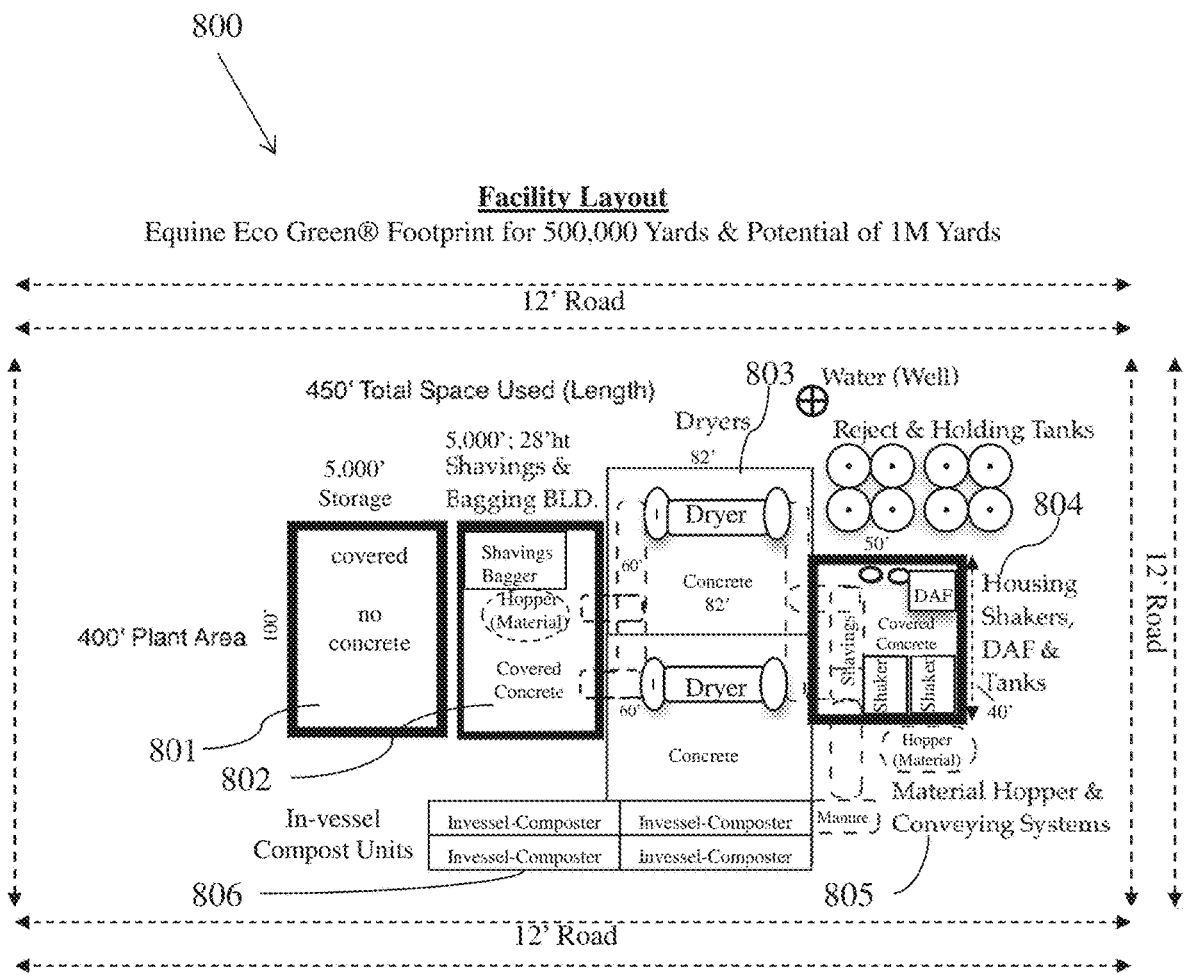
FIG. 8 is a schematic depiction of a processing assembly for recycling animal bedding material.

FIG. 8 is a schematic depiction of a processing assembly for recycling animal bedding material, shown generally at 800. The processing plant assembly includes a storage facility 801, shavings and bagging building 802, dryers 803, and housing for shakers, DAF and tanks at 804 in communication with material hopper and conveying systems 805. In-vessel compost units are shown at 806.

Although fuel products discussed hereinabove relate generally to fire products, it is noted that the fuel products may be utilized as organic fuel as fertilizer. Still another objective of the present invention is to provide a process and a method for manufacturing an organic fuel brick or pellets that can be used for fertilizer in pots, directly in a garden, and with one of the components helping to keep moisture around plants thereby reducing the need to water the plants use the manufactured logs as fertilizer substitute—preferably as a time released nutrient source for plants.

The following examples are provided to more completely describe the system and method described herein. The specific techniques, conditions, materials, proportions and reported data set forth to illustrate the principles and practice of the invention are exemplary only and should not be construed as limiting the scope of the invention.

EXAMPLE

Soiled bedding in the form of wood shavings used in a horse stall and containing horse manure is cleaned using a series of washing, rinsing, and bleaching steps. A bag containing approximately 50 gallons of used bedding is first through a shaking operation to separate most of the manure from the remaining bedding. A gallon of the soiled bedding from which the manure is substantially removed is then placed in a cleaning vessel having a capacity of about five gallons and there washed in about three gallons of a washing solution comprising water to which a quarter-cup of liquid domestic laundry detergent is added per gallon of bedding. The soiled bedding is agitated in the solution for 20 minutes. Then the vessel is drained and refilled with two gallons of rinse water. The soiled bedding agitated periodically during a 20 minute rinse cycle. Thereafter, three-quarters of a cup of 12.5% sodium hypochlorite bleach is added to bleach the shavings to substantially restore their original color and appearance and kill pathogens remaining. Alternatively, chlorine gas (about twenty grams per gallon soiled bedding processed) is used as the bleaching agent. After about ten minutes, the bleaching operation has restored the color of the shavings. Then, sufficient neutralizer in the form of a solution of 3 grams of sodium thiosulfate per gallon of water is added to neutralize the residual chlorine present from the bleach. After neutralization, the characteristic smell of chlorine is no longer perceptible. Conventional chlorine test strips are used to confirm complete neutralization. The now cleaned and sanitized bedding is dewatered and heated in an oven held at 350° F. for about one hour to dry it and kill any remaining pathogens. Alternatively, the drying is carried out for about 2-4 minutes in a rotary drum dryer held at 600-800° F. for 2-4 minutes.

The resulting bedding material has substantially the same texture, color, and appearance as fresh wood shaving bedding, demonstrating that it is suitable for reuse as bedding.

In another aspect, a system for reprocessing soiled animal bedding material commingled with manure to form a compacted product is provided. The system comprises in sequence: (a) a first shaker/screener adapted to separate out at least a preponderance of said manure from said bedding material; (b) a second shaker/screener for cleaning said soiled bedding using a first cleaning agent; (c) a third shaker/screener for rinsing said soiled bedding for a first rinsing period; (d) collecting waste water resulting from at least one of said washing, rinsing, or draining steps in a tank; and (e) drying said bedding to form cleaned recycled bedding material. The process may further comprise one or more additional cycles of washing and rinsing and/or a bleaching cycle employing a bleaching solution of water and a bleaching agent, and a rinse thereafter. It is noted that where a compact system is desired, the process can be carried out in a single shaker/screener unit, or two shaker/screener units. Where just a first shaker/screener is utilized, the (optional) separating step is carried out, followed by overhead spray cleaning or washing and rinsing directly thereafter whereupon a slurry may be formed that is preferably collected in waste tanks for gray material, followed by drying the bedding material. Where two shakers are utilized, a first shaker/screener separates (optional) the manure from the bedding and a second shaker is used for cleaning followed by rinsing, followed by drying of the bedding material. These and other aspects of the process are considered to fall within the scope of the invention.

Having thus described the invention in rather full detail, it will be understood that such detail need not be strictly adhered to, but that additional changes and modifications may suggest themselves to one skilled in the art. It is to be understood that the present system and process may be implemented in various ways, using different equipment and carrying out the steps described herein in different orders. For example, the bleaching operation might be accomplished between two washing cycles. All these changes and modifications are to be understood as falling within the scope of the invention as defined by the subjoined claims.

What is claimed is:

1. A process for reprocessing soiled animal bedding material composed of wood shavings, commingled with manure to form a product, comprising the steps of:
  a. separating said soiled bedding material in a shaker to send at least a preponderance of said manure to a holding tank;
  b. omitting cleaning said separated bedding material with cleaning agents and/or washing and rinsing thereof; and
  c. decontaminating said bedding material by heating and drying said separated bedding material, wherein said bedding material is held at a temperature for a time to ensure that any said manure remaining breaks down and any pathogens are killed;
  d. said separation step being the first step of said process.

2. The process as recited by claim 1, further comprising the step of packaging said product.

3. The process as recited by claim 2, wherein said packaging is carried out by a bagging system configured to receive said product and package it into bags.

4. The process as recited by claim 1, further comprising the step of composting said separated manure.

5. The process as recited by claim 1, wherein additives are added to said bedding material.

6. The process as recited by claim 5, wherein said additives are added to said bedding material after said bedding material is dried.

7. The process as recited by claim 6, wherein said additives comprise botanicals.

8. The process as recited by claim 1 comprising the step of sending said soiled bedding to a second shaker/screener.

9. The process as recited by claim 1, wherein said bedding material is held at a temperature for a time sufficient to attain a required moisture level ranging from about 10 to 17%.

10. In a process for subjecting soiled animal bedding material commingled with manure to form a product comprising the steps of (i) separating said soiled bedding material in a shaker to remove at least a preponderance of said manure therefrom, (ii) omitting cleaning said separated bedding material with cleaning agents and/or washing and rinsing thereof, and (iii) decontaminating said bedding material by heating and drying said bedding material at a temperature and for a time to ensure that remaining manure breaks down and its pathogens are killed, the improvement wherein said separating step comprises the first step of said process.

11. The process as recited by claim 10, wherein said bedding material comprises wood shavings.

12. In a system for subjecting soiled animal bedding material commingled with manure to form an end product during a process comprising the steps of (i) separating said soiled bedding material in a shaker to remove at least a preponderance of said manure therefrom, (ii) omitting cleaning said separated bedding material with cleaning agents and/or washing and rinsing thereof, and (iii) decontaminating said bedding material by heating and drying said bedding material at a temperature and for a time to ensure that remaining manure breaks down and its pathogens are killed, the improvement wherein said separating step comprises the first step of said process.

13. The system as recited by claim 12, wherein said end product is a fuel product.

14. The system as recited by claim 12, wherein said end product is a recycled bedding material.

15. The system as recited by claim 14, further comprising the step of packaging said product.

16. The system as recited by claim 12, wherein said bedding material comprises wood shavings.

17. The system as recited by claim 12 wherein additives are added to said bedding material.

* * * * *